May 15, 1962 R. H. WENDT 3,035,119

REMOTE CONTROLS FOR TELEVISION SPEAKERS

Filed May 25, 1959 2 Sheets-Sheet 1

INVENTOR.
Robert H. Wendt.
BY Robert H. Wendt

May 15, 1962 R. H. WENDT 3,035,119

REMOTE CONTROLS FOR TELEVISION SPEAKERS

Filed May 25, 1959 2 Sheets-Sheet 2

INVENTOR.
Robert H. Wendt.
BY Robert H. Wendt 3,035,119
Patented May 15, 1962

3,035,119
REMOTE CONTROLS FOR TELEVISION SPEAKERS

Robert H. Wendt, 7567 Lincoln Ave., Evanston, Ill.

Filed May 25, 1959, Ser. No. 815,599
1 Claim. (Cl. 179—1)

The present invention relates to remote controls for television speakers, and is particularly concerned with devices for providing simple and inexpensive controls for the speakers which do not affect the picture, so that the user may use the picture to determine whether he is interested in hearing the sound and so that he may cut off the sound whenever desired.

One of the objects of the invention is the provision of improved speaker controls for television sets, which may be controlled by the user, without rising from his chair, at a point remote from the television set so that the sound may be turned off while the picture continues as an indication of the progress of the commercial and to advise the user when the sound should be turned on again to enjoy the program.

Another object of the invention is the provision of sound volume controls for television sets or for radio sets, which are simple in construction, capable of economical manufacture, which cause no damage to the apparatus, and which are adapted to be employed with any type of television set or radio receiver.

Another object of the invention is the provision of improved structures for remote controls for television and radio speakers which minimize the danger of causing a short circuit, which may be employed at any distance, which may shut off the sound temporarily or for a definite period of time, and which are adapted to be secured to an adjacent coffee table or to the arm of an arm chair so that the control may be actuated with a minimum amount of effort.

Other objects and advantages of the invention will be apparent from the following description and the accompanying drawings, in which similar characters of reference indicate similar parts throughout the several views.

Referring to the drawings, of which there are two sheets,

Figures 1, 2, 3, 4, 4A:
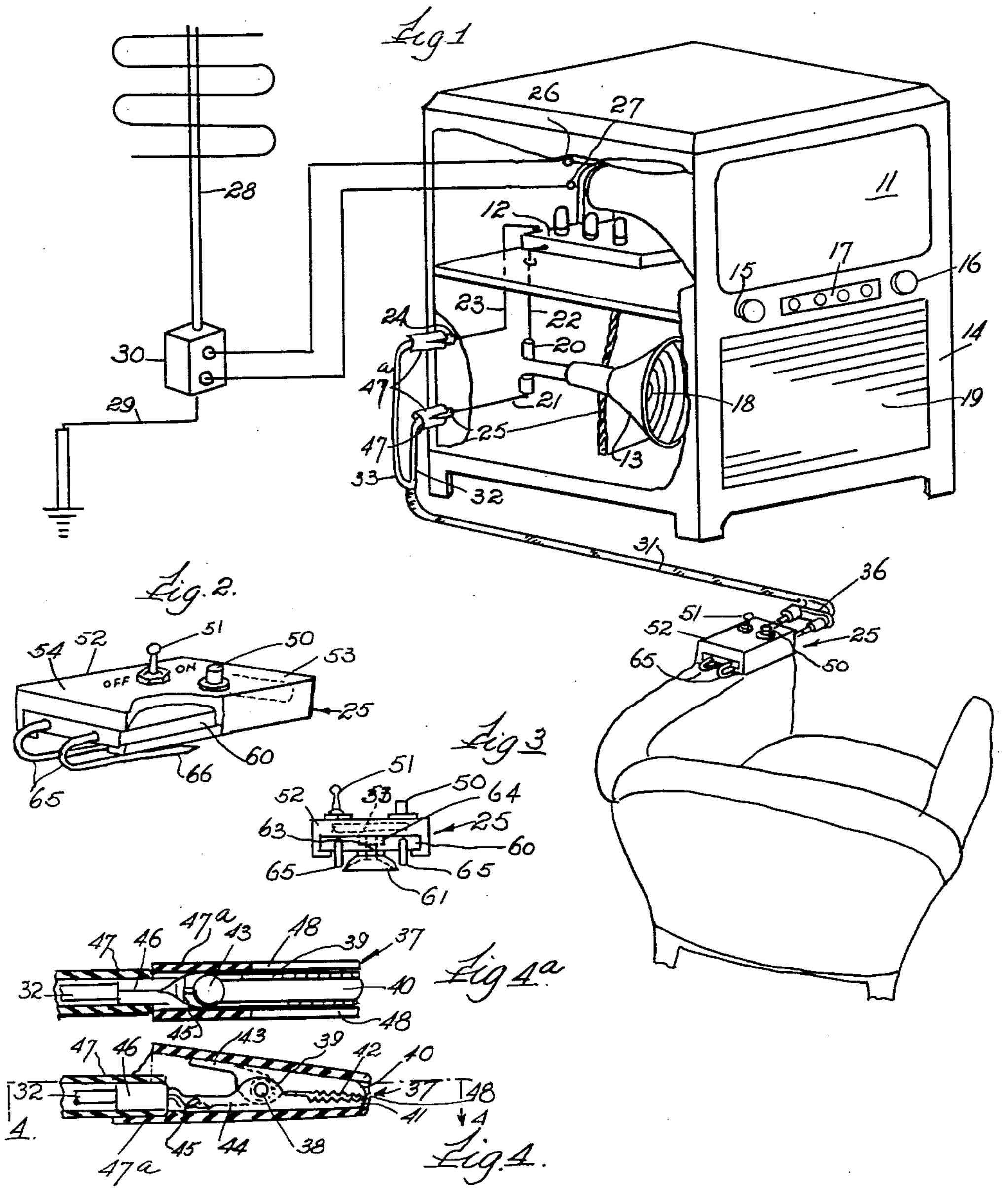
FIG. 1 is a diagrammatic view showing the television apparatus assembly embodying the invention.
FIG. 2 is a view in perspective of one form of control unit, in partial section.
FIG. 3 is an end elevational view.
FIG. 4 is a side elevational view in partial section, showing the structure of the connector.
Figures 5, 6:
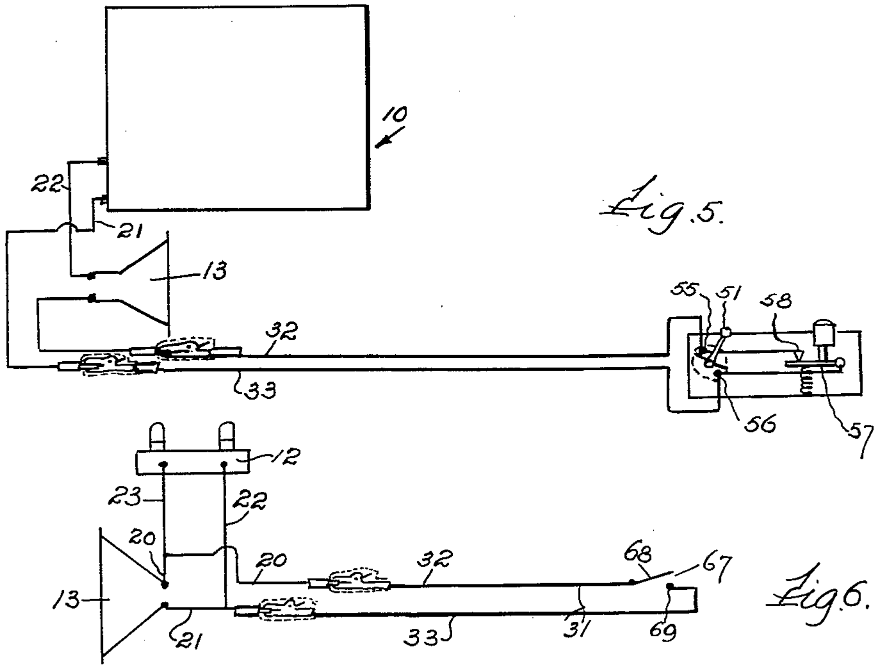
Figure 7:
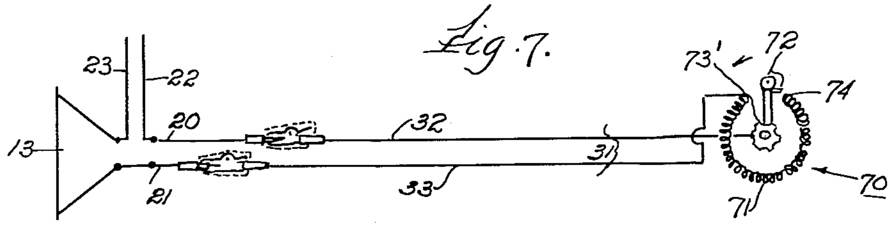
Figure 8:
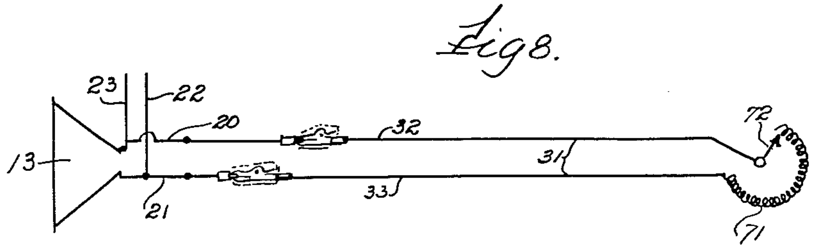

FIG. 4*a* is a fragmentary sectional view of FIG. 4, taken on the plane of the line 4—4 of FIG. 4, looking in the direction of the arrows;

FIG. 5 is a wiring diagram of the circuit breaking type of remote control;

FIG. 6 is a wiring diagram of the short circuiting type;

FIG. 7 is a wiring diagram of the potentiometer type in series;

FIG. 8 is a wiring diagram of the potentiometer type in parallel.

Referring to FIG. 1, 10 indicates any type of television set having a television tube 11, a detecting and amplifying circuit 12, and a speaker 13 supported by a cabinet 14. The same apparatus may be embodied in a radio receiver having the circuit and speaker without the tube.

The television set is provided with the usual volume control knob 15, the tuning knob 16, and various other knobs 17 for adjusting brightness, tuning the set, horizontal control, vertical control, etc.

The speaker 13 has its diaphragm 18 directed toward the grille 19 from which the sound is emitted. The speaker has its coils provided with terminals 20 and 21 usually connected to the conductors 22 and 23 leading to the amplifying circuit 12; but according to the present invention in FIG. 1 the circuit is broken at the connectors 21 and 24 so that the present remote control unit 25 may be included in the circuit.

The television set has the usual antenna connector 26 and the ground connector 27, which are connected to the antenna 28 and to the ground 29 through a lightning arrester 30.

The remote control unit 25 is preferably connected by means of a two conductor cable 31 to the connectors 21 and 24; and the cable 31 may be a high conductivity twisted wire assembly including two conductors 32 and 33 of twisted fine wires embedded and covered with rubber or plastic, making two rounded portions 34 and 35 of insulation integrally joined with a web 36 of the same insulation.

In some cases this cable 31 may be covered with a braided and insulated shielding tube of braided metal wires covered with a sheath of insulation to shield the circuit from any external influences.

The cable 31 is preferably long enough to seat the user at any point desired away from the television set; and for the usual installation a cable 31 of about 30 feet in length is contemplated. Both ends of the cable 31 have the wires 32, 33 stripped to a bare condition; and the television end of each wire is provided with a connector 37 of the jaw type so that it may be readily attachable and detachable.

For example, such a connector has a pivot pin 38 passing through a pair of pivot flanges 39 carried by each jaw 40, 41 which are pivoted on the pin 38. The jaws have teeth 42 and rearwardly extending handles 43, one of which, 44, is provided with an aperture 45 and a pair of curved flanges 46 for gripping the conductor.

The spring 47 urges the teeth 42 into clamping position, which may be relieved by pressing on the handles 43, 44. The bared conductor is passed through the aperture 45 and soldered, while the adjacent insulating portion of the conductor is clamped by the flanges 46.

Two such connectors 37 are provided on the ends of the conductors 32, 33 for engagement with the connectors 21 and 24 adjacent the loud speaker. In order to minimize the possibility of short circuit, one conductor 32 is shorter than the other conductor 33 so that the connectors 37 will never strike each other; and each connector is preferably provided with a split rubber tube **47*a* frictionally engaged over the entire connector 40 and split at 48 so that it may be opened by pressing on the handles 43, 44, which are inside the tube 47**.

The rear end of each connector 40 is provided with a smaller rubber tube 47 which covers the bared portion of the conductor, the clamps 46, and the entire handle 44 inside the first rubber tube 47. Thus the entire connector assembly is protected against short circuit.

The control unit 25 may consist of a simple push button switch 50 or a snap switch assembly 51, or both, as shown in FIG. 2, the snap switch assembly being available for turning off the sound entirely for a predetermined period of time, while the push button 50 may be used for momentarily holding the sound in the "off" position.

These two units are preferably embodied in a single housing 52, having a slot 53 in one end for passing the cable 31, and having a top wall 54, which supports the snap switch 51 and the push button 50.

The bared ends of the conductors 32 and 33 are connected to the usual connectors 55, 56 (FIG. 5) of the screw type on the snap switch 51; and when a push button is also employed, the conductors 32, 33 are connected to the movable contact 57 of the push button 50 and the fixed contact 58.

This push button switch is of the closed circuit type so that it may be opened momentarily by pushing down on the switch button 50. Thus the user may turn off the sound entirely or he may hold the button down to secure temporary relief.

The housing 52 preferably has parallel slots for slidably receiving a bottom plate 60 of insulating material, which may carry a pair of soft rubber suction cups 61, secured by screw bolts 63 threaded into embedded nuts 64. The suction cups are useful for securing the control unit 25 to the smooth top of a table or the like.

The sliding bottom wall 60 may be provided with a U shaped member 65, having a pair of forwardly extending prongs 66, the U shaped member having its prongs on both sides of the suction cups 61, 62.

The yoke of the U shaped member 65 is fixedly secured to the bottom wall 60, but the prongs are resilient and may bend upward for the suction cups to come into play. When the prongs are embedded in the fabric of an arm chair, the suction cups recede sufficiently for the prongs to come into play.

Referring to FIG. 6, this is another modification, in which the circuits 22 and 23 from the speaker 13 remain connected to the television amplifier 12, but the control unit 67 is normally on open circuit; but when its contacts 68 and 69 are closed, the speaker is short circuited because the conductors 32, 33 are connected to the speaker contacts 20 and 21.

Ordinarily this speaker in FIG. 6 works in the usual way; but the sound stops when the speaker is short circuited by the contacts 68 and 69.

Referring to FIG. 8, this is a modification which may be connected like FIG. 6, but which includes a potentiometer 70 having a multiplicity of resistance wire coils 71 for engagement with a rotating slider contact 72 having a knob 73. This potentiometer 70 progressively places resistance in parallel with the speaker 13.

When the arm 72 is at 73, the speaker is practically short circuited and makes no sound; but as the arm 72 slides over the resistance coils 71, the resistance of the short circuit increases until at the other end 74 of the potentiometer a maximum is included, and the volume of sound at the speaker is varied accordingly. At the open circuit position of the arm 72, as shown, the control is entirely out of circuit.

Referring to FIG. 7, this shows a similar potentiometer connected in series with the speaker coils in the same manner as FIGS. 1 and 5. In this case the sound may be stopped entirely when the arm 72 is on open circuit and the speaker circuit is broken; but the sound may also be varied from no sound until maximum, depending on the position of the arm 72 on the resistance coils 71.

The method of installation of the present remote control for television speakers is that the circuit of the speaker may be broken at 20, 21 and the wires 32, 33 may be connected in series with the speaker coils in FIGS. 1, 5, and 7.

In FIGS. 6 and 8 the circuit of the speaker is not broken, but the control is connected in parallel with the speaker coils.

The conductors of the cable 31, being of high conductivity, they do not place appreciable resistance in the speaker coil circuit when they are included in series; and thus the speaker may operate in a normal manner with the control of FIG. 1 in circuit.

It will thus be observed that I have invented a remote control for the sound of television or radio speakers. By means of my remote control the user may sit at a point remote from the television set or radio receiver; and when an undesirable commercial comes on, it may be stopped momentarily or for the duration of the commercial, while the picture continues to indicate the subject-matter.

The user may listen to any part of a commercial in which he may be interested, and may turn off the rest; and in general, the pleasure of using television or radio receiver sets is greatly increased by utilizing my control.

The present control may also have a salutary effect on the length and frequency of commercials when it becomes known that users do not have to listen to long, loud or repetitious commercials.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

A device for providing a loud speaker of a television receiver with a remote controlled sound cut-out, comprising an elongated section of a two conductor assembly of insulated high conductivity twisted wire having both conductors covered with plastic insulation and the coverings joined by an integral web of insulation, the said two conductor assembly being of sufficient length to extend from the television receiver to the chair of a viewer in front of the television receiver, said conductor assembly having its insulation extending to an insulating housing, an electric switch in said housing and having its terminals connected to the ends of the conductors in said housing to open or close the circuit including said conductors, said housing having a rear opening provided with a sliding bottom closure plate of insulation covering the terminals, a pair of resilient rubber suction cups depending from said insulating cover plate for holding the housing in fixed position on a smooth surface support, a pair of U shaped pointed resilient prongs carried parallel to said insulating cover plate on opposite sides of said rubber cups and adapted to penetrate into the fabric of a chair upholstery to hold the housing in fixed position thereon, the resilient cups receding when the prongs are used and the cups protruding beyond the prongs, which recede resiliently when the cups are secured to a smooth surface, a pair of jaw type electrical connectors carried by the conductors at the other ends of said conductor assembly, the conductors being severed at unequal lengths to prevent any contact between the two connectors, a resilient rubber tube covering the jaws of each connector for permitting the jaws to be opened and closed without interference, and a tubular insulation covering the conductor and connector at their juncture, the said conductors and switch being interposed in a television speaker circuit, and connecting the separate connectors to the separate ends of the broken circuit, the sound of the speaker ceasing when the switch is on open circuit, while the picture continues to indicate without interruption the subject-matter of the sound available, and the speaker current passing through the two elongated high conductivity conductors and switch to the speaker when the switch is closed to effect normal television operation subject to sound cut-out at will.

References Cited in the file of this patent

UNITED STATES PATENTS

| | | |
|---|---|---|
| 2,445,031 | McDonald | July 13, 1948 |
| 2,778,875 | Wiles et al. | Jan. 22, 1957 |
| 2,835,736 | Sansotta | May 5, 1958 |
| 2,907,217 | Siegel | Oct. 6, 1959 |

FOREIGN PATENTS

| | | |
|---|---|---|
| 779,156 | Great Britain | July 17, 1957 |